US00RE48227E

(19) United States
(12) Reissued Patent
Ball, Jr. et al.

(10) Patent Number: US RE48,227 E
(45) Date of Reissued Patent: Sep. 29, 2020

(54) UNINTERRUPTED ALTERNATING AIR CIRCULATION FOR USE IN LUMBER KILNS

(71) Applicant: KILN DRYING SYSTEMS & COMPONENTS, LLC, Hendersonville, NC (US)

(72) Inventors: Troy Eugene Ball, Jr., Canton, NC (US); Robert Girardi, Louden, TN (US); Robert King Pollock, Chapel Hill, NC (US)

(73) Assignee: Kiln Drying Systems & Components, LLC, Hendersonville, NC (US)

(21) Appl. No.: 16/529,500

(22) Filed: Aug. 1, 2019

Related U.S. Patent Documents

Reissue of:
(64) Patent No.: 9,874,397
Issued: Jan. 23, 2018
Appl. No.: 14/925,909
Filed: Oct. 28, 2015

U.S. Applications:
(63) Continuation-in-part of application No. 13/831,361, filed on Mar. 14, 2013, now Pat. No. 9,200,834.

(51) Int. Cl.
*F26B 3/04* (2006.01)
*F26B 15/14* (2006.01)
(Continued)

(52) U.S. Cl.
CPC ..... *F26B 3/04* (2013.01); *F26B 3/06* (2013.01); *F26B 15/16* (2013.01); *F26B 21/004* (2013.01);
(Continued)

(58) Field of Classification Search
CPC .... F26B 3/00; F26B 3/04; F26B 15/14; F26B 15/16; F26B 25/10; F26B 25/12; F26B 25/063; F26B 25/001; F26B 25/008
See application file for complete search history.

(56) References Cited

U.S. PATENT DOCUMENTS 1,885,418 A 11/1932 Darrah
2,001,001 A 5/1935 Rolf
(Continued)

OTHER PUBLICATIONS

Boone & Simpson, Chapter 02 Kiln Types and Features—USDA Agricultural Handbook AH-188: Dry Kiln Operator's Manual, 2001, 31 pages, USDA, found at http://www.fpl.fs.fed.us/documnts/usda/ah188/chapter02.pdf.
(Continued)

*Primary Examiner* — Joseph A Kaufman
(74) *Attorney, Agent, or Firm* — Kevin E Flynn; Flynn IP Law

(57) ABSTRACT

Kiln design that uses a series of at least two subsections with airflow in constant but alternating directions instead of using bi-directional fans that periodically reverse directions. The uninterrupted alternating air flow may be used in continuous drying kilns (CDK) with two sets of carriages carrying spaced stacks of lumber travel in opposite directions through a sequence of chambers. The uninterrupted alternating air flow may be used with a set of at least one pathway for carriages carrying lumber to be dried where all carriages move from a first end of the kiln to a second end of the kiln.

31 Claims, 8 Drawing Sheets

(51) Int. Cl.

| | |
|---|---|
| ***F26B 25/10*** | (2006.01) |
| ***F26B 25/06*** | (2006.01) |
| ***F26B 25/12*** | (2006.01) |
| ***F26B 3/06*** | (2006.01) |
| ***F26B 15/16*** | (2006.01) |
| ***F26B 21/00*** | (2006.01) |
| ***F26B 21/02*** | (2006.01) |

(52) U.S. Cl.
CPC ..... *F26B 21/022* (2013.01); *F26B 21/028* (2013.01); *F26B 2210/16* (2013.01)

(56) References Cited

U.S. PATENT DOCUMENTS

| | | | | | |
|---|---|---|---|---|---|
| 2,718,713 | A | | 9/1955 | Bloxham | |
| 3,422,545 | A | | 1/1969 | Wilson | |
| 4,098,008 | A | | 7/1978 | Schuette | |
| 4,357,762 | A | * | 11/1982 | Eustacchio | C04B 33/30 34/229 |
| 4,432,147 | A | | 2/1984 | Chen | |
| 4,972,604 | A | | 11/1990 | Breckenridge | |
| 5,050,314 | A | | 9/1991 | Breckendridge | |
| 5,269,076 | A | | 12/1993 | Breckenridge | |
| 5,414,944 | A | | 5/1995 | Culp | |
| 5,416,985 | A | | 5/1995 | Culp | |
| 5,437,109 | A | | 8/1995 | Culp | |
| 5,447,003 | A | | 9/1995 | Warren | |
| 5,488,785 | A | | 2/1996 | Culp | |
| 5,836,086 | A | * | 11/1998 | Elder | F26B 3/04 34/396 |
| 6,219,937 | B1 | | 4/2001 | Culp | |
| 6,370,792 | B1 | | 4/2002 | Culp | |
| 6,393,723 | B1 | | 5/2002 | Nagel | |
| 6,467,190 | B2 | | 10/2002 | Nagel | |
| 6,652,274 | B2 | | 11/2003 | Nagel | |
| 7,571,554 | B2 | | 8/2009 | Sprague | |
| 7,963,048 | B2 | | 6/2011 | Pollard | |
| 8,046,932 | B2 | | 11/2011 | Wolowiecki | |
| 8,201,501 | B2 | | 6/2012 | Tinsley | |
| 8,875,414 | B2 | | 11/2014 | Blomquist | |
| 9,200,834 | B1 | * | 12/2015 | Ball, Jr. | F26B 25/063 |
| 2007/0044341 | A1 | * | 3/2007 | Pollard | F26B 15/12 34/201 |
| 2011/0056087 | A1 | * | 3/2011 | Tinsley | F26B 15/16 34/201 |
| 2014/0259733 | A1 | * | 9/2014 | Blomquist | F26B 15/00 34/500 |
| 2018/0010254 | A1 | * | 1/2018 | Tan | F26B 3/04 |
| 2019/0234686 | A1 | * | 8/2019 | Brodie | F26B 21/004 |

OTHER PUBLICATIONS

Progressive tunnel drying kilns—screen shot of web page on site maintained by KATRES Ltd.; as shown Jul. 6, 2013 at http://www.katres.cz/en/products/progressive-tunnel-kilns/ showing longitudinal cross section of a kiln and related airflows.

Giroux, Paul, Kiln Fans—From Design to Optimizing Performance, Western Dry Kiln Association Meeting 2004, May 2004, 5 pages, Western Dry Kiln Association, Portland Oregon.

* cited by examiner

1300

2300

4300

UNINTERRUPTED ALTERNATING AIR CIRCULATION FOR USE IN LUMBER KILNS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims priority to co-pending U.S. patent application Ser. No. 13/831,361 filed Mar. 14, 2013 for Uninterrupted Alternating Air Circulation for Continuous Drying Lumber Kilns. The '361 application is incorporated by reference.

BACKGROUND

Field of the Disclosure

This disclosure applies to systems of the continuous drying kiln (CDK) design, (also referred to as dual path or triple length kilns), in which two paths of lumber travel in opposite directions through a sequence of chambers in which wood is pre-heated, dried, equalized and then conditioned. This disclosure also applies to unidirectional kilns where one or more sets of carriages on one or more sets of pathways to convey lumber through a first end of a kiln to a second end of a kiln.

FIG. 1 introduces a series of elements found in continuous drying kilns. Typically a continuous drying kiln will have a structure 104 with a first end 108 and a second end 112 at the opposite end of the structure 104. Running through the structure 104, is a first pathway 116 and a second pathway 120. The pathways frequently use rails 124 to guide a first set of carriages 128 along the first pathway 116 and a second set of carriages 132 along the second pathway 120. The carriages (128 132) may have wheels (not shown) much like those found on railroad cars.

If the first set of carriages 128 enters the structure 104 through the first end 108 and exits through the second end 112, then the second set of carriages 132 enters the structure 104 through the second end 112 and exits through the first end 108. Thus, when lumber 130 is stacked on the carriages (128 and 132) and exposed to heat in the main drying section 300, the heated lumber 136 passes near lumber that has not yet been in the main drying section 300 (green lumber 140). Note the simplified drawing in FIG. 1 shows the lumber as an essentially solid stack. This is not the case. Spacers (not shown) are placed across each layer of boards within each stack of lumber 130 to provide open area for air movement through the lumber stack 156. Weights (not shown) on top of each lumber stack 156 compress the lumber 130 and spacers provide restraint, minimize warping, and prevent boards from falling off of the top of the lumber stack. To minimize the air flow that might otherwise go over the top of the lumber stack 156 within the structure 104, structure 104 has longitudinal baffles (220 FIG. 2) that are aligned with the long axis of the structure 104 and thus aligned with the direction the lumber stacks travel through the kiln and orthogonal to the flow of air from the first side 144 to the second side 148 of the structure or to the flow of air from the second side 148 to the first side 144 of the structure 104. These longitudinal baffles 220 are designed to minimize the leakage of air between the fan deck (224 discussed below) and the top of the lumber stack 152, thus directing the air to flow through the air spaces between the layers of lumber 130 separated by spacers in the lumber stacks.

In the first end energy recovery section 310 and in the second end energy recovery section 340, the heated lumber 136 passes heat to the green lumber 140 to partially heat and dry the green lumber 140 and the green lumber 140 cools the heated lumber 136 by absorbing heat and by evaporating the moisture content of the green lumber 140.

Thus, lumber stack 156 starts as green lumber 140 stacked upon the first set of carriages 128 with spacers to allow for air flow amongst stacked lumber 136. As the first set of carriages 128 moves along the first pathway 116, the green lumber 140 is exposed to air that is circulating in the first end energy recovery section 310. FIG. 2 shows a cross section of the first end energy recovery section 310, operating in a first circulation direction 204 as fans 200 push the air in the first circulation direction 204. The fans 200 operate in openings in a center wall 228 that extends above the fan deck 224. The center wall 228 helps promote circulation by having a high pressure side downstream of the fan 200 and a low pressure side upstream from the fan 200.

Having an appropriate pressure gradient from the high pressure side of the center wall 228 to the low pressure side will cause a desired distribution of circulating air amongst the stacked lumber across the two sets of carriages (128 and 132). Heat from heated lumber 136 on the second pathway 120 partially dries and heats the green lumber 140. Likewise the moisture from the green lumber 140 helps cool the heated lumber 136. One of skill in the art will appreciate that the heating of the green lumber 140 is going to be most pronounced as the hot air reaches the green lumber 140 directly after leaving the heated lumber 136 and before the circulating air returns to the fans 200 above the fan deck 224. Likewise, one of skill in the art will appreciate that the cooling of the heated lumber 136 is going to be most pronounced as the moist air reaches the heated lumber 136 directly after leaving the green lumber 140 and before the circulating air returns to the fans 200 above the fan deck 224.

To reduce the variability between lumber 130 on the first side 144 and the second side 148 of the first set of carriages 132 or the second set of carriages 132, the fans 200 are periodically stopped and allowed to coast to a full stop. Then the fans 200 are operated in the reverse direction to push air in the second circulation direction as shown in FIG. 3. Now air that has made a complete pass through the heated lumber 136 enters the green lumber 140 on the first side 144 of the green lumber 140 and the air that has passed through the green lumber 140 enters the heated lumber 136 on the first side 144.

Normal practice is to reverse the fan direction about once every two to four hours. The period of running the fan in one direction is often called a fan cycle. The overall time to cure the lumber is frequently 40 hours although it may be longer for wood needing extra drying. As the first end energy recovery section 310, main drying section 300, and second end energy recovery section 340 all have fans that are periodically stopped and reversed (usually at the same time), a particular stack of lumber on a carriage should expect to have the fans stop approximately 10, 13, 20, or even more times during transit through the structure 104.

When heated lumber 136 that has recently passed through the main drying section 300 and entered the first end energy recovery section 310 or the second end energy recovery section 340, there is a risk that heavily dried and heated hot spots on the heated lumber 136 may be smoldering. Fire may be less likely in the main drying section if oxygen levels are reduced from exposure to an external direct fired burning furnace. However, even a momentary lack of circulation in an energy recover section can increase fire risk as the circulation of cooler moist air from the green lumber 140 abates and a hot spot may progress to an open fire. Thus, many structures include intermediate orthogonal baffles 320 within the energy recovery sections (310 and 340) to limit the travel of oxygen rich air from the first end 108 or the second end 112 towards the lumber in the energy recovery sections (310 or 340) that has recently emerged from the main drying section 300. While first end energy recovery section 310 and second end energy recovery section 340 both are shown with a single set of intermediate orthogonal baffles 320, there may be additional intermediate orthogonal baffles 320 to subdivide the first end energy recovery section 310 and second end energy recovery section 340 into additional energy recovery subsections (314, 318, 344, and 348 in FIG. 1). Additional orthogonal partitions 324 define the boundaries of the main drying section 300 although conventional structures do not currently have subsections within the main drying section 300.

The first end 108, and second end 112 may have some level of orthogonal baffles to limit the ingress of oxygen and loss of heat, but the structure 104 is typically far from hermetically sealed as there is a need for water vapor to leave the structure 104 at the first end 108 and second end 112 often as visible fog.

Returning to the processing of lumber stack 156 stacked upon the first set of carriages 128, eventually, the lumber stack 156 progresses from the first end energy recovery section 310 through orthogonal partitions 324 to enter the main drying section 300.

The main drying section 300 is much like the energy recovery sections 310 and 340 with a set of bi-directional fans 200 located above a fan deck 224 circulating air alternatively in the first circulation direction 204 and the second circulation direction 208. Longitudinal baffles 220 keep the circulating air from passing between the top of the lumber stacks 152 and the fan deck 224. A complication in the main drying section 300 for direct fired kilns is that an additional circulation path is needed to move air from the structure 104 to a mixing chamber where hot flue gas from a direct fired burner is mixed with the returning air from the structure 104 to create a mix within a prescribed temperature range.

This mix of heated air and flue gas is returned to the main drying section 300 to increase the temperature and decrease the humidity of the return air which is reintroduced to the main drying section 300. A blower forces heated air leaving the mixing chamber into a distribution duct that extends the length of the main drying section 300. The distribution duct may release heated air in an upward direction through apertures in the top surfaces of the fan deck 224 or it may also release heated air in a downward direction through slotted vertical ducts, which are called downcomers, that are located between the first pathway 116 and second pathway 120 below the fan deck 224. The apertures and downcomers may be tuned to promote uniform distribution of the heated air. The flue gas leaving the direct fire burner may be near 2000 degrees Fahrenheit but after mixing with the return air from the structure 104, may return to the main drying section 300 at 450 degrees Fahrenheit which is nearly twice the main drying section set point air temperature which is often between 240 degrees Fahrenheit and 260 degrees Fahrenheit.

As one can imagine, the process of stopping the fans 200 in the main drying section 300 poses special problems as circulation from the fans 200 is needed to avoid overheating the top of the lumber stacks 152. Thus, while fans 200 are slowing, stopping, and coming back up to speed in the opposite direction, the blower continues to deliver additional air to the structure 104. During this time period when fan direction is being reversed, the burner abort stack (not shown) opens momentarily and the direct fired burner (1534 in FIG. 5 discussed below) is placed on idle in order to maintain the operating of the temperature in the direct fired burner (1534) while suspending heat energy delivery from the direct fired burner (1534) to the main drying section 300. The opening of the abort stack allows ambient air into the mixing chamber (1538 below), during which time the opening of the return air damper acts to increase recirculation of air flow from the kiln structure 104 into the mixing chamber (1538) at the same time that the amount of heat being passed from the direct fired burner (1534) into the mixing chamber (2538) is reduced.

Eventually, lumber stack 156 stacked upon the first set of carriages 128 emerges from the main drying section 300 through orthogonal partitions 324 to enter the second end energy recovery section 340. Now the lumber is heated lumber 136 giving off heat and drying green lumber 140 on carriages 132 on the second pathway 120. The heated lumber 136 is exposed to air moving in the first circulation direction 204 and in the second circulation direction 208 as the bi-directional fans 200 are periodically turned off, allowed to coast to a stop, and then restarted in the opposite direction.

The lumber stack 156 emerges from the second end 112 and is eventually removed from the carriage 132.

Lumber on carriages 132 on the second pathway 120 receive the same sequence of treatments but travel in the opposite direction from the second end 112 to the first end 108.

The process of reversing from the first circulation direction 204 to the second circulation direction 208 may take fifteen minutes or more before the fully developed air flow pattern and dry bulb set point temperatures are regained. The sequence is as follows. First, the fans 200 are de-energized and allowed to coast to a full stop. After ample time elapses for all fans 200 in all sections of the structure 104 to reliably come to a full stop, the fans 200 are restarted in the opposite direction and eventually establish circulation at the desired speed. While the time to allow the fans to coast to a stop and restart may be as short as five minutes, some interruptions in the provision of heat may be in the 15 minute range as the heating system may be turned off before the fans are de-energized and heat may not be fully resumed for a few minutes after the fans have been re-energized. While the fans 200 are not energized and providing circulation at the desired rate, several things are not happening.

1) Heat is not being added to the main drying section so the process of drying the lumber slows down. In the case of a steam radiator system, the loss of air flow will decrease the heat delivered to the main drying section 300 even if the steam is not isolated from the steam radiators.
2) Heat from a direct fired burner (if this is used rather than a steam system discussed below) turned down as direct fired burner goes to idle mode in order to avoid heating. After idling, the dynamics of the direct fired burner may require time to return to full operating levels of heat production.

3) Temperatures within the structure may develop local hot spots as circulation is needed to prevent hot spots.
4) Heated and now dry lumber does not receive the circulation from green lumber and may develop overheated sections.
5) The advancement of carriages will be slowed. Many structures use a periodic push of the carriages for movement rather than extremely slow continuous movement, but in either event, the push rate is selected to allow for the appropriate drying and curing of the lumber so that the lumber is within the structure 104 for an adequate time.

| Length of fan cycle | Number of 15 minute transitions for 40 hour transit through the structure | Percentage of time that heat is NOT being added to the structure. |
|---|---|---|
| 2 hour fan cycle | 20 | 1/9 - approximately 11 percent. |
| 3 hour fan cycle | At least 13 | 1/13 - approximately 7.7 percent. |
| 4 hour fan cycle | 10 | 1/17 - approximately 5.9 percent. |

While there may not be a one to one relationship between the percentage of time that heat is not being delivered to the structure 104 and a reduction from optimal throughput for the structure, the loss in throughput should be proportion to the loss of time spent heating the structure 104

SUMMARY OF THE DISCLOSURE

The present disclosure teaches the use fans to circulate heated air to dry lumber in a kiln. The fans do not periodically stop and reverse directions as in prior art designs. Instead, the alternating direction of air flow is provided by moving the carriage of lumber from one subsection of the kiln with air always moving in a first direction to an adjacent subsection of the kiln where the air always moves in the opposite direction from the first direction. Elimination of fan reversals will enhance kiln fire safety and reduce the time and energy required to heat lumber in kilns, while improving the quality and uniformity of lumber being processed. Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

Use with Continuous Drying Kilns.

Figure 4:
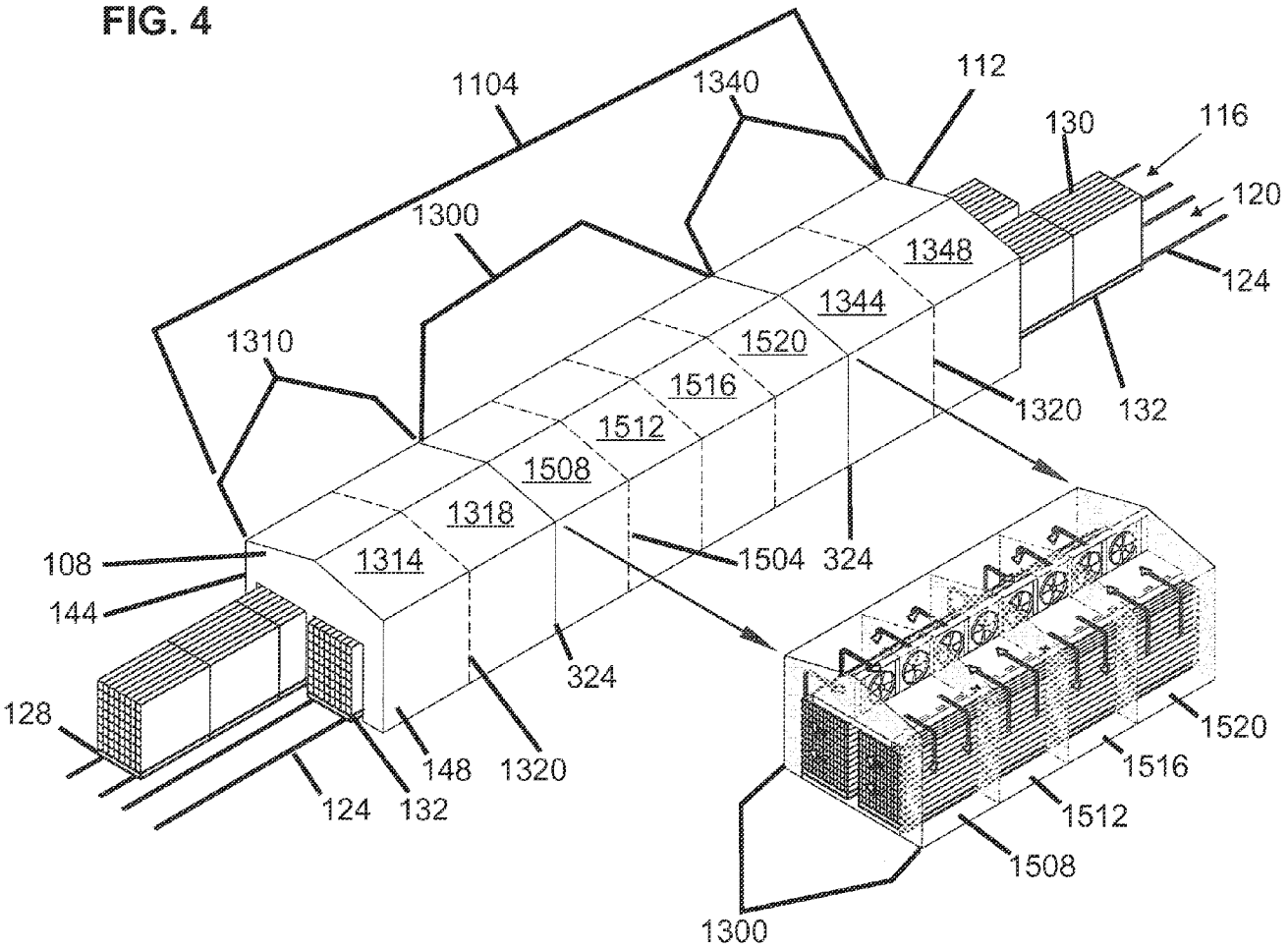
FIG. 4 shows a continuous kiln using teachings from the present disclosure that illustrates some of the teachings of the present disclosure with a main drying section shown pulled out of the structure in order to provide context for FIG. 5.

FIG. 4 shows a structure 1104 that illustrates some of the teachings of the present disclosure. Many elements present in FIG. 4 were introduced during the discussion of prior art structure 104 in FIG. 1. Structure 1104 has a first end 108 and a second end 112 and a first side 144 and a second side 148. Lumber 130 is stacked upon the first set of carriages 128 on rails 124 forming the first pathway 116 to traverse the structure 1104 from the first end 108 through the second end 112. Lumber 130 is stacked upon the second set of carriages 132 to traverse the structure 1104 from the second end 112 through the first end 108. The manner of stacking lumber 130 upon carriages with spacers (sometimes called "stickers") and weights may be the same as discussed in connection with FIG. 1. As described in more detail below, the lumber 130 is exposed to periods of air movement in the first circulation direction 204 and to periods of air movement in the second circulation direction 208 as the relevant carriage passes through the structure 1104.

Structure 1104 differs from structure 104 in that the main drying section 1300 has a number of orthogonal MD partitions 1504 to subdivide the main drying section 1300 which is bounded by orthogonal partitions 324.

Thus main drying section 1300 has, in this instance, four subsections 1508, 1512, 1516, and 1520. The number of main drying section subsections does not need to be four but will be at least two and will usually be an even number of subsections as there is apt to be a desire to expose the lumber to equal ranges of the main drying section operated in the first circulation direction 204 and the second circulation direction 208 (as described below).

Figure 5:
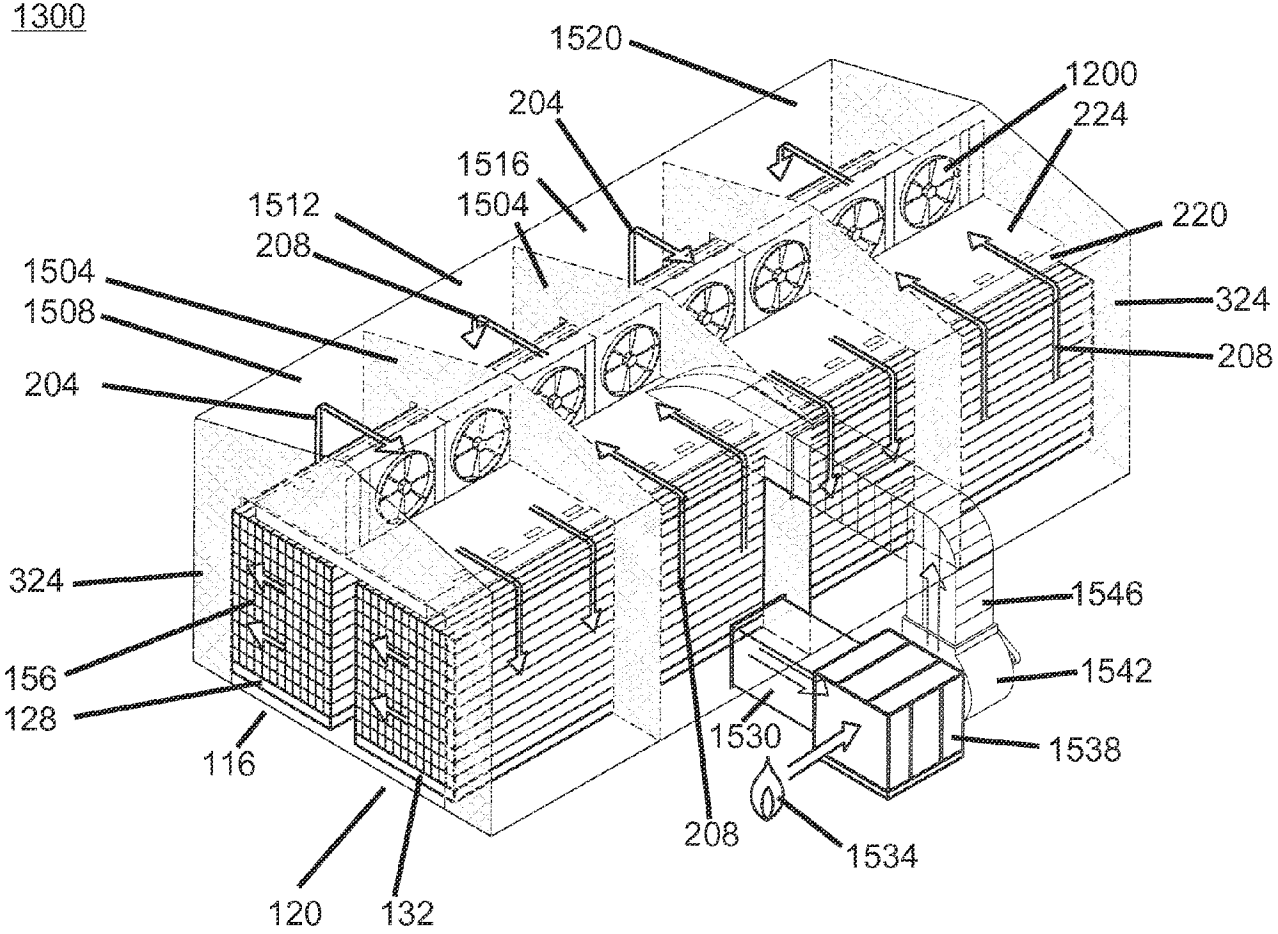
FIG. 5 provides an enlarged view of the main drying section used with a direct fired burner.

FIG. 5 provides an image of the main drying section 1300 in greater detail. FIG. 4 shows the relationship between the details in FIG. 5 and the structure 1104 by showing an image of the main drying section 1300 pulled out of the structure 1104.

Turning to FIG. 5, a main drying section 1300 with subsections 1508, 1512, 1516, 1520 defined by orthogonal partitions 324 and orthogonal MD partitions 1504. A return air duct 1530 draws air from one or more subsections 1508, 1512, 1516, and 1520. If not directly connected to all subsections, the return air duct 1530 is apt to be connected to the one or two subsections in the middle of the main drying section 1300 or to the two ends of the main drying section 1300 to promote movement of air across the length of the main drying section 1300. Note that while the various orthogonal MD partitions 1504 impede the flow of air longitudinally, the seal is not perfect and air will flow based on pressure gradients. A direct fired burner 1534 (represented here by a flame) feeds burner exhaust at approximately 2000 degrees Fahrenheit into a mixing chamber 1538 to provide a mix of burner exhaust with return air from the return air duct 1530 to provide an output supplied to the main drying section 1300 above the main drying section set point which is often between 240 degrees Fahrenheit and 260 degrees Fahrenheit. The heated air is supplied via the supply duct 1546 and distributed to the space between the fan deck 224, to the tops of the lumber stacks 156 and through down comers, located between the first pathway 116 and second pathway 120 below the fan deck 224. The air moving to and from the mixing chamber 1538 may be moved by a blower 1542 located after the mixing chamber 1538.

As lumber 130 on the first set of carriages 132 passes through the orthogonal partition 324 separating the main drying section 1300 from the first end energy recovery section 1310 (FIG. 4), the lumber 130 is exposed to air moving in the first circulation direction 204. The air in the first subsection 1508 of the main drying section 1300 always moves in the first circulation direction 204 as structure 1104 uses fans 1200 that are operated in a single direction. The fans 1200 may be bi-directional fans like fans 200 that are used in a retrofitted structure or they may be unidirectional fans that are optimized to push air in one direction only with blades designed for this purpose but lack the additional design features and components needed for a bi-directional fan.

The fans 1200 in subsections 1508 and 1516 push air in the first circulation direction 204. But fans 1200 in subsections 1512 and 1520 push air in the second circulation direction 208. Thus, lumber stack 156 on first set of carriages 128 or the second set of carriages 132 is subject to alternating circulation directions (208 and 204) without intermediate periods of no circulation as fans are de-energized, slowed to a stop, and started in the opposite direction.

Figure 6:
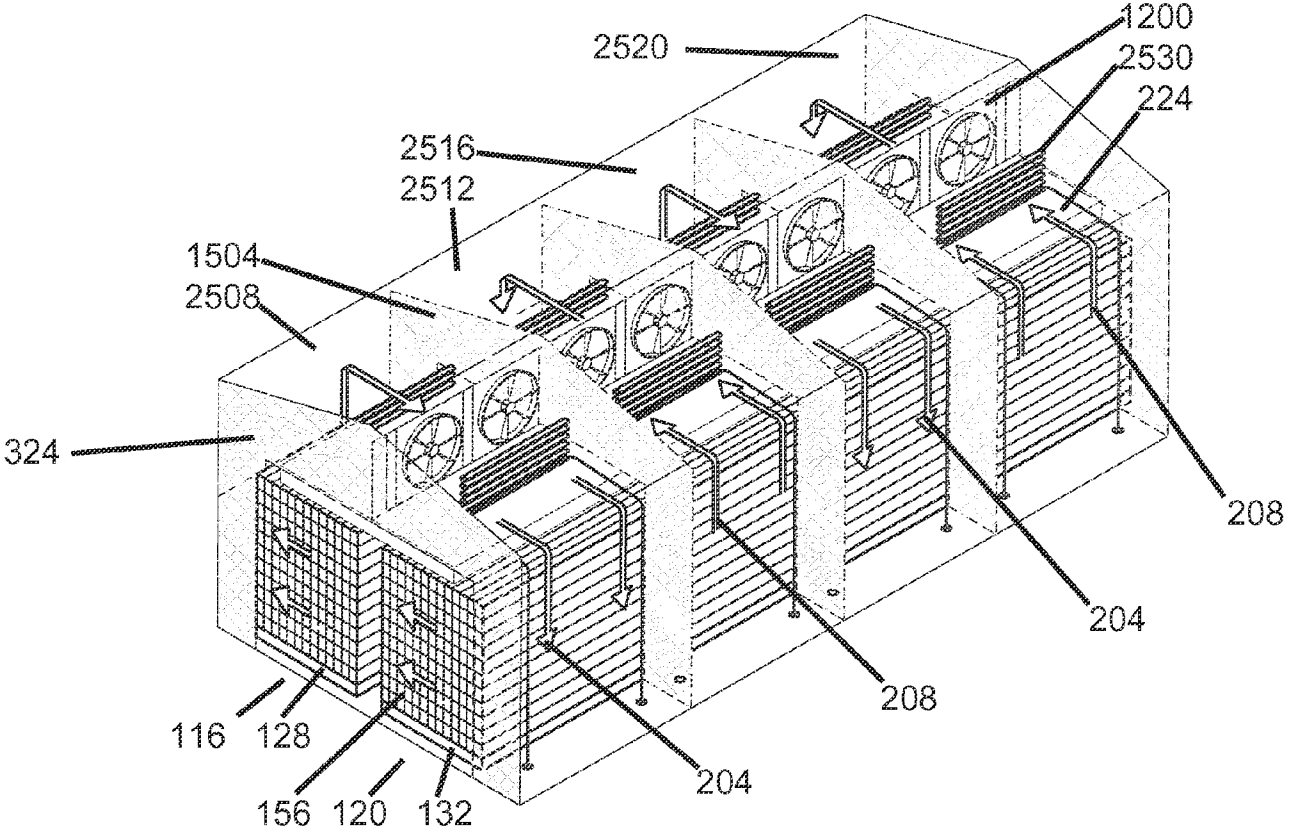
FIG. 6 shows an alternative main drying section that uses steam heat exchangers to provide heat to the main drying section.

FIG. 6 shows an alternative main drying section 2300 that uses steam heat exchangers 2530 to provide heat to the alternative main drying section 2300. Analogous to the discussion of FIG. 5, in FIG. 6, the fans 1200 in subsections 2508 and 2516 push air in the first circulation direction 204. But fans 1200 in subsections 2512 and 2520 push air in the second circulation direction 208. Thus, lumber stacks 156 on first set of carriages 128 or the second set of carriages 132 is subject to alternating circulation directions (204 and 208) without intermediate periods of no circulation as fans are de-energized, slowed to a stop, and started in the opposite direction.

The steam supply to the steam heat exchangers 2530 may be regulated with control valves as is known in the art. While steam heat exchangers 2530 are shown on both sides of the fans 1200, one of skill in the art will recognize that the steam heat exchangers 2530 could be on a single side of the fans 1200 or with additional heat exchangers between or besides the pathways (116 and 120).

Figure 1:
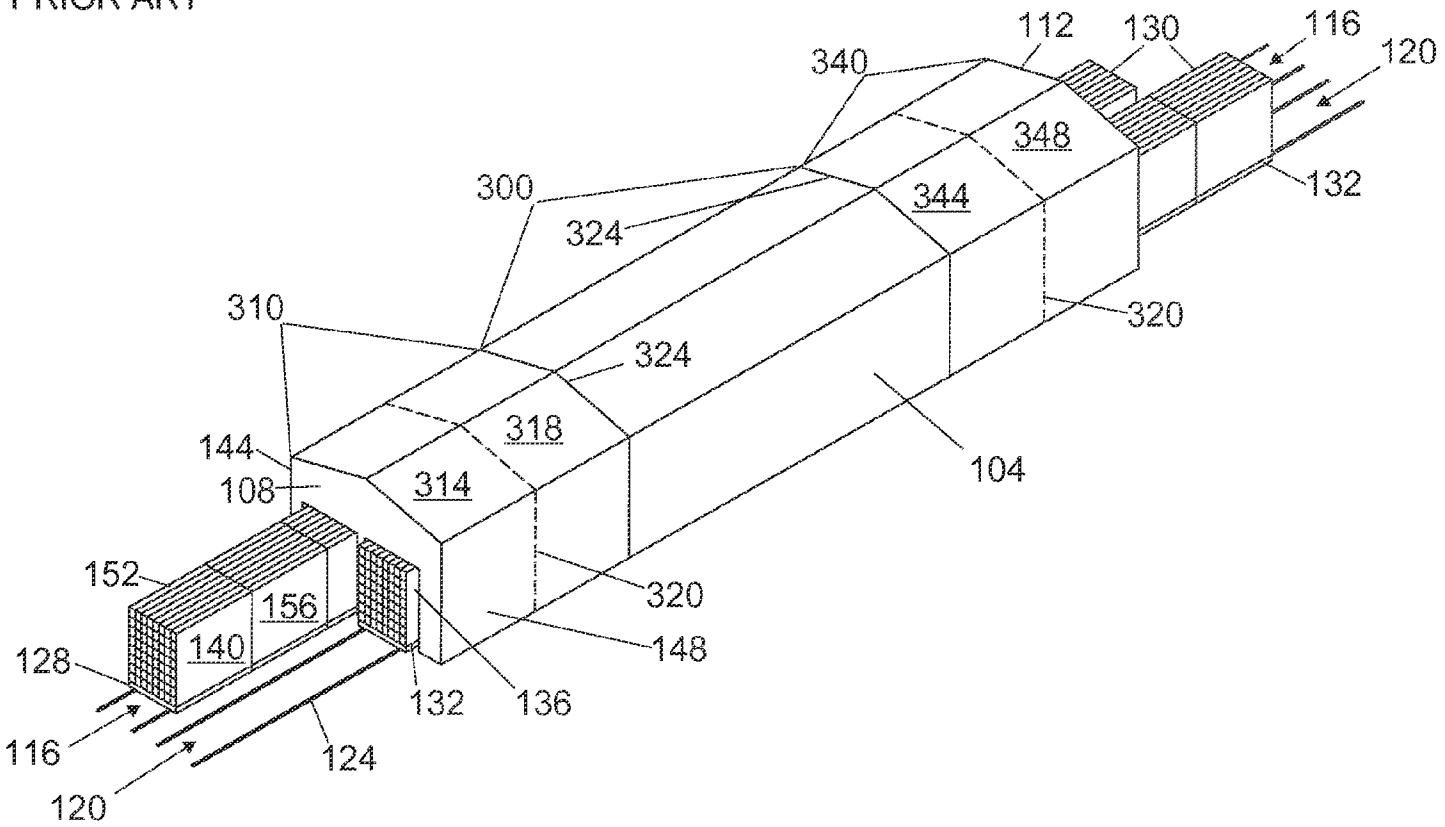
FIG. 1 PRIOR ART
FIG. 1 is a continuous kiln as exists in prior art
Figure 2:
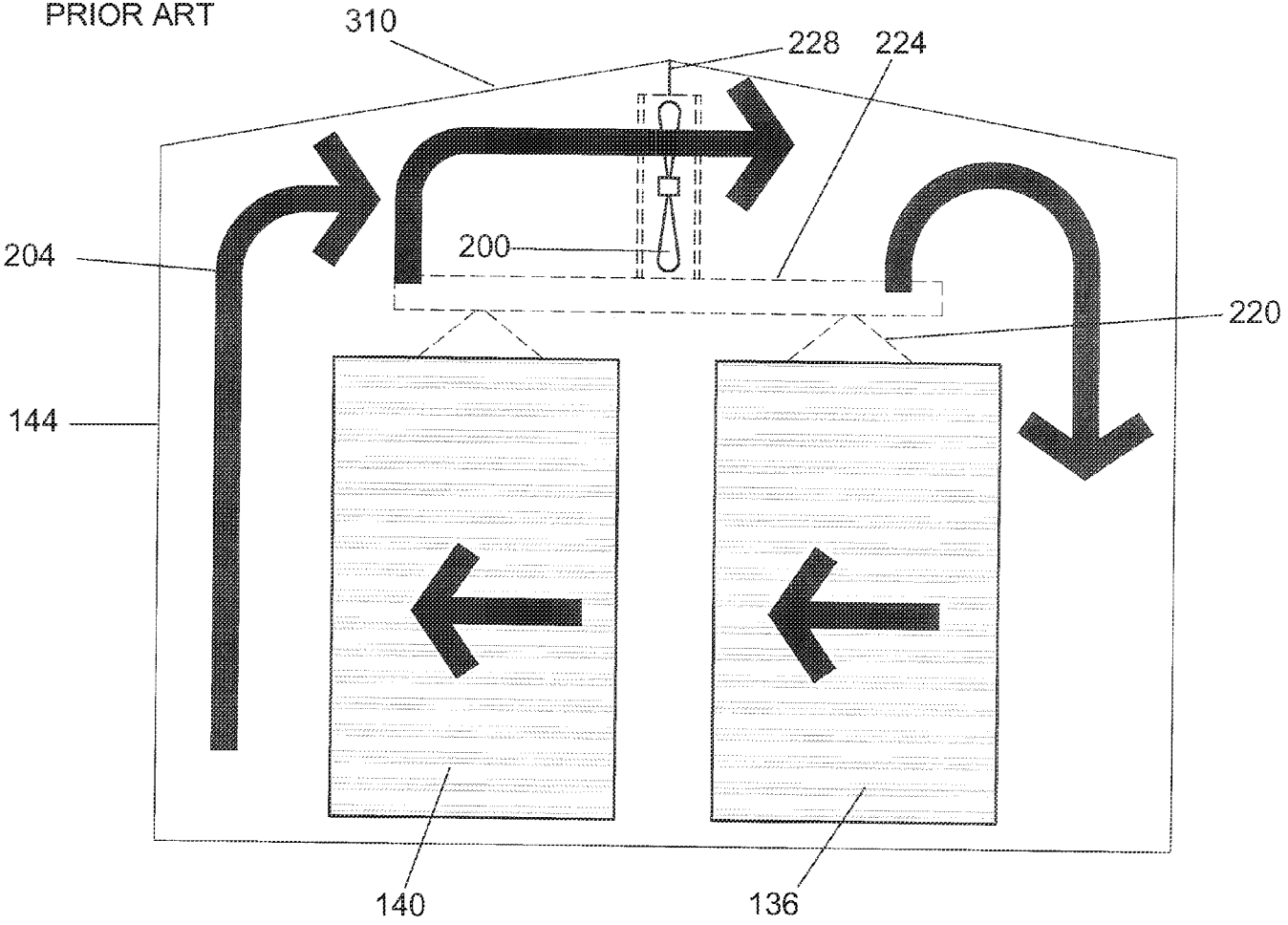
FIG. 2 PRIOR ART
FIG. 2 is a diagram of clockwise rotation of heated air trough lumber stacks
Figure 3:
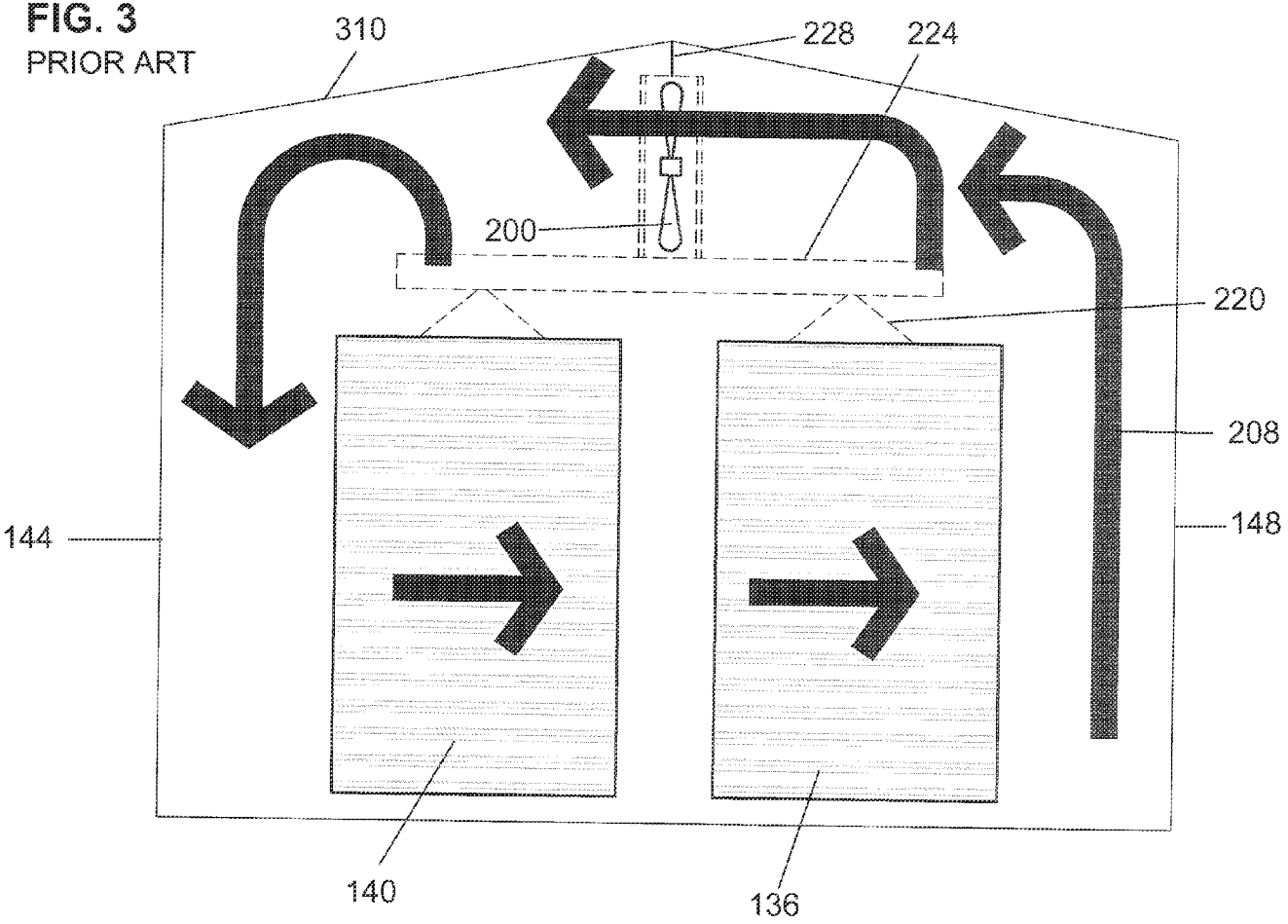
FIG. 3 PRIOR ART
FIG. 3 is a diagram of counter-clockwise rotation of heated air trough lumber stacks.

Returning to FIG. 4, the intermediate orthogonal baffles 320 of FIG. 1 may be termed intermediate orthogonal partitions 1320. Thus, fans in subsection 1314 may continuously circulate air in the first circulation directions 204 and fans in subsection 1318 may continuously circulate air in the second circulation direction 208 so that movement of a carriage between subsection 1318 and subsection 1508 results in a change in air circulation direction from the second circulation direction 208 to the first circulation direction 204 or the reverse, depending on the direction of movement of the carriage 128 or 132. Likewise, fans 1200 in subsection 1348 may continuously circulate air in the second circulation directions 208 and fans 1200 in subsection 1344 may continuously circulate air in the first circulation direction 204 so that movement of a carriage between subsection 1520 and subsection 1344 results in a change in air circulation direction.

One of skill in the art can appreciate that instead of using two subsections per energy recovery section (1310 and 1340) that one could use four or other even numbers of subsections. One could also use an odd number of subsections in the energy recovery sections (1310 and 1340) potentially by changing the lengths of the subsections so that the total amount of time subject to each circulation direction (204 and 208) is maintained equal even if done in a different number of segments. Alternatively, there may be a bias to pass heat from heated lumber to green lumber or moisture from green lumber to heated lumber.

While not absolutely required, it is expected that in most instances, there will be an even number of subsections in the alternative main drying section (1300 or 2300) and there will be the same number of subsections in the first end energy recovery section 1310 as in the second end energy recovery section 1340.

The orthogonal partitions 324, 1320, and 1504 use baffles created to allow passage of a carriage loaded as intended (with lumber, spacers, and weights) but substantially conform to that profile so that longitudinal flow of air is limited. However, as the stacking of lumber, spacers, and weights may have some small variation from carriage to carriage, the baffles must have a capacity to give way when a larger than expected profile attempts to cross an orthogonal partition. The baffles are intended to be easy to adjust or replace during maintenance outages so that longitudinal air flow continues to be effectively resisted.

Placing a set of baffles on a faux partition external to the structure 1104 for pathways heading toward the structure 1104 may be useful to allow adjustments to the green lumber 140, spacers, and weights on a carriage to minimize the amount of contact with the baffles inside the structure 1104. Working for conformity with the expected profile for a loaded carriage will reduce wear on the baffles inside the structure 1104 which will mean better resistance to longitudinal air flow over time and will reduce the risk that a grossly misaligned piece of lumber or weight will be knocked off the carriage by a baffle unable to move out of the way of such a misaligned stack.

As the direction of airflow in the energy recovery subsections adjacent to the main drying section is fixed, the structure may be optimized to provide the direction of airflow in these critical sections that is most useful for preventing an outbreak of fire on the recently heated lumber. For example, it may be prudent in these energy recovery subsections nearest the main drying section to always circulate air to push air from the green lumber directly onto the heated lumber to maximize the cooling effect on the heated lumber, especially as the lumber enters subsections with oxygen contents closer to atmospheric levels. Alternatively, some installations may want to design the structure with the concept that the hot air leaving the heated lumber is pushed directly onto the green lumber without going through a circulation fan to maximize the drying effect on the green lumber. With fixed flow directions per subsection, the designer has the opportunity to optimize a design as the flow confronting each carriage of lumber will be the same for that subsection, and the order of circulation flow directions encountered by the lumber will be the same for all carriages as they pass through the drying process. A structure 104 using mirror image energy recovery sections 314 and 318 will subject the first set of carriages 128 and the second set of carriages 128 to the same sequence and durations of first circulation direction 204 and second circulation direction 208. In the event, a designer does not opt for mirror images, then the sequence will differ.

Use with Unidirectional Kilns.

The teachings of the present disclosure may be used with unidirectional kilns that have all lumber travel in a single direction. While the concept is expressed in connection with drawings that show a single set of carriages conveying lumber from a first end to the second end of a structure, the concept is applicable to structures having two or more sets of carriages conveying lumber on parallel pathways from the first end to the second end of the structure. Thus, if the drawings of FIG. 4, FIG. 5 and FIG. 6 were assumed to show two parallel pathways 116 and 120 where all carriages 128 and 132 move from the first end 108 to the second end 112, these drawings could be used to demonstrate the use with two parallel pathways both traveling in the same direction. The invention may be extended to three or more parallel pathways.

As the need for drying time in the structure may differ for one batch of lumber to another batch as the thickness, moisture content, and other parameters may differ from one batch of lumber to another batch, nothing in this disclosure should be interpreted to require that all carriages on all pathways move at the same speed or pattern so that the lumber spends the same amount of time within the structure no matter which pathway the lumber is on.

Figure 7:
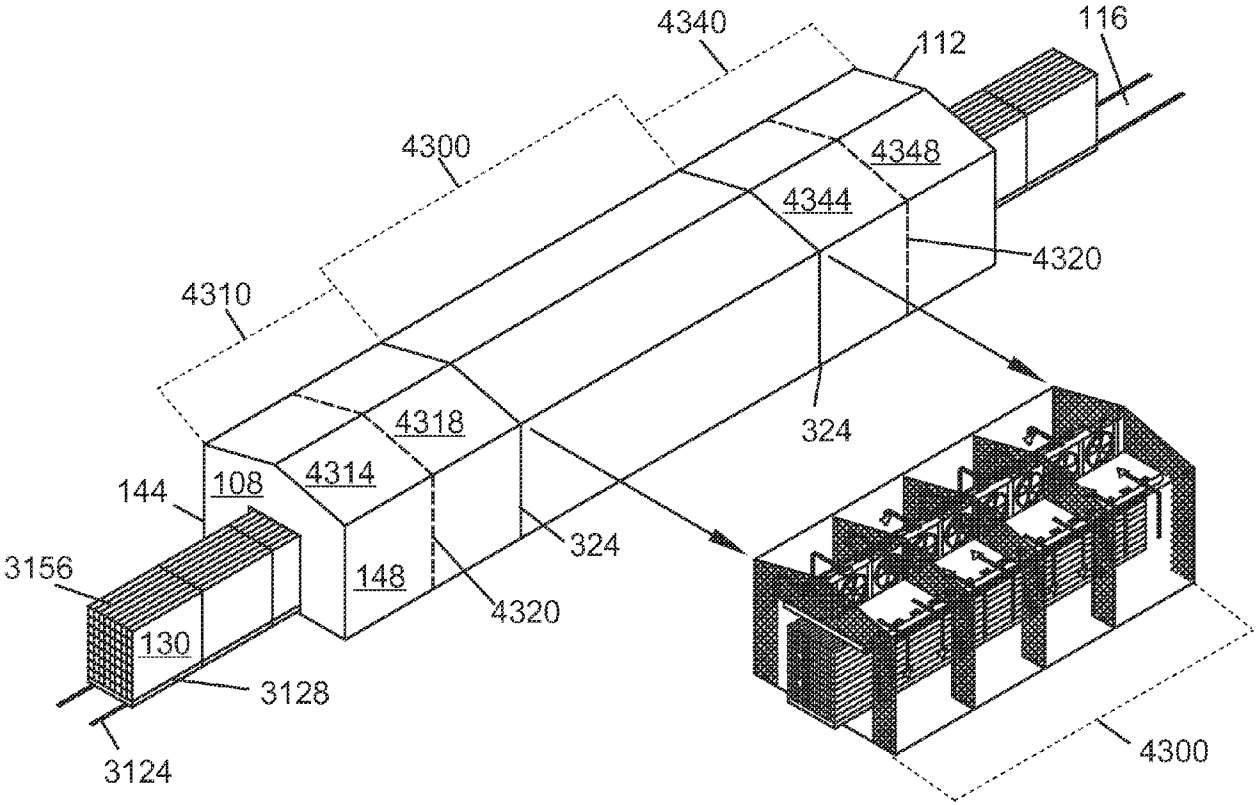
FIG. 7 shows a unidirectional kiln that has all lumber traveling in a single direction that illustrates some teachings from the present disclosure with a main drying section shown pulled out of the structure in order to provide context for FIG. 8.

FIG. 7 shows a structure 3104 that illustrates some of the teachings of the present disclosure. Many elements present in FIG. 7 were introduced during the discussion of prior art structure 104 in FIG. 1. Structure 3104 has a first end 108 and a second end 112 and a first side 144 and a second side 148. Lumber 130 is stacked upon a set of carriages 3128 on rails 3124 forming the first pathway 116 to traverse the structure 3104 from the first end 108 through the second end 112. The manner of stacking lumber 130 upon carriages with spacers (sometimes called "stickers") and weights may be the same as discussed in connection with FIG. 1. As described in more detail below, the lumber 130 is exposed to periods of air movement in the first circulation direction 204 and to periods of air movement in the second circulation direction 208 as the relevant carriage passes through the structure 3104.

Structure 4104 differs from structure 104 in that the main drying section 4300 has a number of orthogonal MD partitions 4504 (See FIG. 8) to subdivide the main drying section 4300 which is bounded by orthogonal partitions 324 (See FIG. 8) to separate the main drying section 4300 from first chamber 4310 and third chamber 4340.

The first chamber 4310 and may or may not have a capacity to provide additional heat to the lumber as first chamber 4310 may simply allow heat from main drying section 4300 to pass into first chamber 4310 to preheat the lumber. The third chamber 4340 and may or may not have a capacity to provide additional heat to the lumber as third chamber 4340 may simply allow the heated lumber exiting from the main drying section 4300 to become uniformly heated as heat passes from the exterior of the lumber to the interior and to cool down before leaving the second side 148.

FIG. 5 provides an image of the main drying section 4300 in greater detail. FIG. 7 shows the relationship between the details in FIG. 8 and the structure 3104 by showing an image of the main drying section 4300 pulled out of the structure 4104.

Main drying section 4300 has, in this instance, four subsections 4508, 4512, 4516, and 4520. The number of main drying section subsections does not need to be four but will be at least two and will usually be an even number of subsections as there is apt to be a desire to expose the lumber to equal ranges of the main drying section operated in the first circulation direction 204 and the second circulation direction 208 (as described below).

Figure 8:
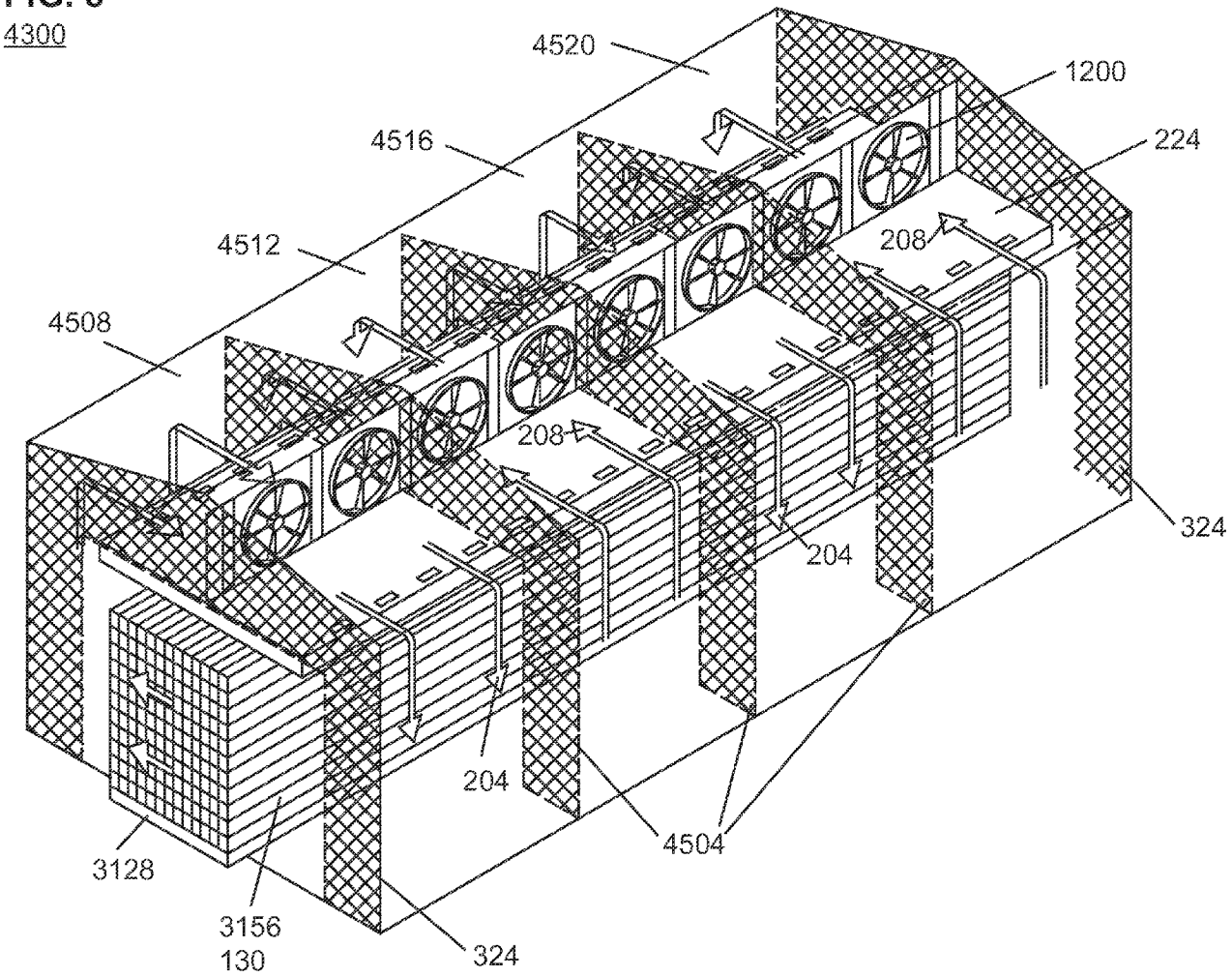
FIG. 8 provides an enlarged view of the main drying section from FIG. 7.

Turning to FIG. 8, a main drying section 4300 with subsections 4508, 4512, 4516, 4520 defined by orthogonal partitions 324 and orthogonal MD partitions 4504.

The main drying section 4300 may have a return duct that draws air from one or more subsections in the manner discussed in connection with FIG. 5. Note that while the various orthogonal MD partitions 4504 impede the flow of air longitudinally, the seal is not perfect and air will flow based on pressure gradients. As discussed in connection with FIG. 5, a direct fired burner feeds burner exhaust at approximately 2000 degrees Fahrenheit into a mixing chamber to provide a mix of burner exhaust with return air from the return air duct to provide an output supplied to the main drying section 4300 above the main drying section set point which is often between 240 degrees Fahrenheit and 260 degrees Fahrenheit. As discussed in connection with FIG. 5, the heated air is supplied via the supply duct and distributed to the space between the fan deck 224, to the tops of the lumber stacks 3156. As discussed in connection with FIG. 5, the air moving to and from the mixing chamber may be moved by a blower located after the mixing chamber.

As lumber 130 on the set of carriages 3128 passes through the orthogonal partition 324 separating the main drying section 4300 from the first chamber 4310 (FIG. 7), the lumber 130 is exposed to air moving in the first circulation direction 204. The air in the first subsection 4508 of the main drying section 4300 always moves in the first circulation direction 2084 as structure 4104 uses fans 1200 that are operated in a single direction. The fans 1200 may be bi-directional fans like fans 200 that are used in a retrofitted structure or they may be unidirectional fans that are optimized to push air in one direction only with blades designed for this purpose but lack the additional design features and components needed for a bi-directional fan.

The fans 1200 in subsections 4508 and 4516 push air in the first circulation direction 204. But fans 1200 in subsections 1512 and 1520 push air in the second circulation direction 208. Thus, lumber stack 3156 on the set of carriages 3128 is subject to alternating circulation directions (204 and 208) without intermediate periods of no circulation as fans are de-energized, slowed to a stop, and started in the opposite direction.

The teachings of the present disclosure may be applied to a structure that has all carriage pathways travel in a single direction and uses steam heat exchangers to provide heat to the main drying section as discussed in connection with FIG. 6. The steam supply to the heat exchangers may be regulated with control valves as is known in the art.

Returning to FIG. 7, the intermediate orthogonal baffles 320 of FIG. 1 may be termed intermediate orthogonal partitions 4320. Thus, fans in subsection 4314 may continuously circulate air in the first circulation directions 204 and fans in subsection 4318 may continuously circulate air in the second circulation direction 208 so that movement of a carriage between subsection 4318 and subsection 4508 (FIG. 8) results in a change in air circulation direction from the second circulation direction 208 to the first circulation direction 204. Likewise, fans 1200 in subsection 4348 may continuously circulate air in the first circulation directions 204 and fans 1200 in subsection 4348 may continuously circulate air in the second circulation direction 208 so that movement of a carriage between subsection 4520 (FIG. 8) and subsection 4344 results in a change in air circulation direction.

One of skill in the art can appreciate that instead of using two subsections in the first chamber 4310 or the third chamber 4340 that one could use four or other even numbers of subsections. One could also use an odd number of subsections in the first chamber 4310 or the third chamber 4340 potentially by changing the lengths of the subsections so that the total amount of time subject to each circulation direction (204 and 208) is maintained equal even if done in a different number of segments.

The orthogonal partitions 324, 4320, and 4504 use baffles created to allow passage of a carriage loaded as intended (with lumber, spacers, and weights) but substantially conform to that profile so that longitudinal flow of air is limited. However, as the stacking of lumber, spacers, and weights may have some small variation from carriage to carriage, the baffles may have a capacity to give way when a larger than expected profile attempts to cross an orthogonal partition. The baffles are intended to be easy to adjust or replace during maintenance outages so that longitudinal air flow continues to be effectively resisted.

Placing a set of baffles on a faux partition external to the structure 4104 for pathways heading toward the structure 4104 may be useful to allow adjustments to the green lumber 140, spacers, and weights on a carriage to minimize the amount of contact with the baffles inside the structure 4104. Working for conformity with the expected profile for a loaded carriage will reduce wear on the baffles inside the structure 4104 which will mean better resistance to longitudinal air flow over time and will reduce the risk that a grossly misaligned piece of lumber or weight will be knocked off the carriage by a baffle unable to move out of the way of such a misaligned stack.

Advantages from Using Continuous Fan Operation

One should expect that all other things being equal the push rate of a structure converted from reversing fan operation to alternating single direction fan operation should increase as heat will continue to be applied to the structure without interruption for fan direction reversals. As kilns of this type are frequently used continuously for extended periods and then serviced in a maintenance outage, an increase in push rate results in an increase in production capacity without decreasing quality.

Operation of heating systems of any type are usually easier at steady state and more difficult when there are transients since monitoring equipment set points must often be altered for transient conditions but may be set to closer tolerances during steady state operation as deviations are more meaningful during steady state operation.

One should expect reduced maintenance and operation costs from running fans in a constant direction as motors and other components receive additional strain during the effort to start the motor and accelerate the fan.

One should expect a reduced risk of fire in the structure 1304 or 4304 as continuous airflow over lumber in carriages will reduce the formation of hot spots within the structure which might have occurred during a cessation of air flow during a fan direction change. Hot spots during a period without air circulation may cause a portion of the structure to move from an operating temperature of approximately 250 degrees Fahrenheit to more than 300 degrees Fahrenheit. Given that fire suppression sprinkler heads are used with thermally activated fuse links that are often designed to open between 330 degrees 360 degrees Fahrenheit, there are risks that a thermal transient from a hot spot might trigger a sprinkler which would not be useful for drying wood. More importantly, triggering fused sprinkler heads also requires and immediate shutdown to replace the one-time activated fire suppression equipment, resulting in significant production delays and loss of production efficiency. With the use of single direction fans, the set points for fire protection equipment can be dropped to respond more quickly to true fires without the risk of responding to a transient thermal hot spot.

Fire Detection Instruments may be positioned and have alarm set-points optimized for a particular subsection. Knowing the direction of air flow will allow alarms to be placed in optimized locations. Tolerances for temperature or smoke detection may be tuned to be more proactive as the instruments will not have to compensate for the conditions associated with dead air disturbed only by natural thermal convection during the absence of forced air circulation. Thus, with tighter tolerances, the fire detection and suppression equipment can react quicker to any aberrant measurement that may indicate the onset of a fire. With the air largely precluded from longitudinal movement by the orthogonal partitions, smoke concentrations will rise faster in a particular subsection than would otherwise be the case which will further assist in the early detection of a fire. Fire suppression systems can be set to react to indications of a minor fire by only applying water to the specific subsection implicated as potentially having a fire. This avoids unnecessary spoilage of lumber that is not at risk of fire. The fire suppression systems may be automatically or manually activated so that instances of activation will not necessarily require replacing equipment.

Given that the direction of air flow within a subsection is known, the fire suppression systems can be optimized for the direction of air flow. For example, side mounted fog or water deluge nozzles maybe placed to envelope or soak the upwind side of a carriage enabling water droplets to be carried by the air flow through the lumber from the upwind to downwind side of the carriage. Side mounted fog, deluge, or other nozzle arrays could be mounted on the upwind side of each of the one or more first pathways to optimize fire suppression options and to make use of uninterrupted alternating air circulation.

A structure designed with the teachings of the present disclosure may be able to achieve air movement with less fan amps as fan blades designed for unidirectional operation may be more efficient than the compromise inherent in bi-directional fan blades. Typically, the delivered CFM per motor horse power is greater for unidirectional fan blades than it is for fan blades that must be shaped and pitched to equally propel air in opposite directions based on alternating rotation.

Alternatives and Variations

Those of skill in the art will recognize that the direction of travel of the first set of carriages 128 on the first pathway 116 and the second set of carriages 132 on the second pathway 120 may be reversed from the directions discussed above without deviating from the teachings of the present disclosure.

While it is anticipated that many that use the teachings of the present disclosure will use unidirectional fans or will perpetually use bi-directional fans in one direction, the option remains of using bi-directional fans and reversing the direction of all the fans during a maintenance overhaul if that is perceived to have a benefit of elongating the life of any fan component.

Those of skill in the art will recognize that the formation of partitions to form subsections may be facilitated by choosing places within the structure that have structural supports such as beams, pillars, and trusses.

A number of direct fire burners may be used to provide the heat if direct fire burners are used rather than steam. The burners used for wood kilns include biomass (such as green sawdust or wood waste) direct fired burners, fossil fuel (such as coal, natural gas, or petroleum products) heating units, or other direct fired burners.

The push rate for moving carriages and the widths of subsection widths may be selected so that a carriage enters one subsection with one circulation direction and then enters the next subsection to be subject to airflow of the opposite circulation direction every two to four hours. For some installations, a three hour interval may be optimal. Those of skill in the art will recognize that a kiln using lower temperatures or flow rates, a different carriage width, or a different amount of rows and spacers may find that a different time duration is suitable, perhaps less than two hours, perhaps more than four hours.

Sub-Sections of Different Lengths.

While the figures discussed above had uniform subsections lengths from one end of the structure to the other end, this is not a requirement.

Finally, there may be times when a structure originally designed for reversing fan operation is upgraded to uni-direction operation. As there are advantages to building the structures for partitions to coincide with existing steel supports, one may make some adjustments to sub-section length to take advantage of existing structure. An important criterion is limiting the maximum time duration exposed to any one circulation direction. A particularly long distance between existing structural steel may be further subdivided into two or three subsections to avoid an overly prolonged exposure to circulation in one direction.

Turning Off Fans During a Fire Incident.

While there are advantages to having fire detection and suppression equipment tuned for a single circulation direction rather than having to compromise to accommodate both circulation directions (204 and 208), the fire suppression scheme may call for de-energizing at least some fans in the structure to minimize the oxygen fed to the fire. Even in a system that anticipates using fire suppression with the fans de-energized, there will be advantages in early detection of a fire for a system that does not have alternating circulation directions within a single subsection.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A structure for curing lumber, the structure comprising:

at least one pathway for carriages holding lumber;

a first end of the structure for ingress of carriages holding lumber;

a second end of the structure for egress of carriages holding lumber;

a first side located between the first end and the second end;

a second side located between the first end and the second end such that the at least one pathway for carriages runs from the first end to the second end between the first side and the second side;

a set of partition baffles to subdivide the structure into at least two subsections, the partition baffles operating to allow passage of carriages holding lumber towards the second end but interfere with a longitudinal flow of air from the first end towards the second end or from the second end towards the first end; and fans operating in a unidirectional mode to cause air flow to move in one circulation direction within a subsection but in a different circulation direction opposite of the one circulation direction in an adjacent subsection so that the air flow alternates between traveling across the carriage holding lumber from the first side to the second side in one subsection and from the second side to the first side in the adjacent subsection whereby the carriages holding lumber traverse from the first end of the structure to the second end of the structure without being in a subsection where all the fans are stopped and reversed.

2. The structure of claim 1 wherein there *are* at least two pathways for carriages holding lumber and each of the at least two pathways for carriages runs from the first end to the second end between the first side and the second side.

3. The structure of claim 1 wherein the carriages ride upon tracks.

4. The structure of claim 1 wherein heat is applied to the at least two subsections through use of steam heat which passes through heat exchangers exposed to moving air in the at least two subsections.

5. The structure of claim 1 wherein air in the at least two subsections is heated via one or more direct fired burners.

6. The structure of claim 1 wherein the at least two subsections [is] *are* subdivided into an even number of subsections of equal length.

7. The structure of claim 1 wherein *the* at least two subsections [is] *are* subdivided into a number of subsections such that a sum of a set of lengths of subsections receiving air flow in the one circulation direction is equal to a sum of a set of lengths of subsections receiving air flow in the different circulation direction.

8. The structure of claim 1 wherein at least one subsection has a fire suppression system adapted to work better with air circulation in the one circulation direction than with air circulation in the different circulation direction.

9. The structure of claim 1 wherein a fire suppression system has instruments placed to detect fires better when air circulation is in the one circulation direction than with air circulation in the different circulation direction.

10. The structure of claim 1 wherein a fire suppression system has fire suppression nozzles placed to suppress fires better when air circulation is in the one circulation direction than with air circulation in the different circulation direction.

11. A main drying section within a structure for curing lumber, the main drying section comprising:

at least one pathway for carriages holding lumber;

a first end of the main drying section for ingress of carriages holding lumber*;* a second end of the main drying section for egress of carriages holding lumber;

a first side located between the first end and the second end;

a second side located between the first end and the second end such that the at least one pathway for carriages runs from the first end to the second end between the first side and the second side;

a set of partition baffles to subdivide the main drying section into at least two subsections, the partition baffles operating to allow passage of carriages holding lumber towards the second end but interfere with a longitudinal flow of air from the first end towards the second end or from the second end towards the first end; and fans operating in a unidirectional mode to cause air flow to move in one circulation direction within a subsection but in a different circulation direction opposite of the one circulation direction in an adjacent subsection so that the air flow alternates between traveling across the carriage holding lumber from the first side to the second side in one subsection and from the second side to the first side in the adjacent subsection whereby the carriages holding lumber traverse from the first end of the main drying section to the second end of the main drying section without being in a subsection where all the fans are stopped and then reversed.

12. A method of curing lumber wherein lumber is stacked upon a first carriage with spacers to allow air flow across the lumber to be dried, the method using a structure comprising[.]*:* at least one pathway for carriages holding lumber to be dried;

a first end of the structure for ingress of carriages holding lumber on the at least one pathway;

a second end of the structure for egress of carriages on the at least one pathway;

a main drying section located between the first end and the second end;

the main drying section receiving heat input to dry the lumber to be dried;

a set of partition baffles to subdivide the main drying section into at least two subsections, the partition baffles operating to allow passage of carriages holding lumber to be dried towards the second end but interfere with a longitudinal flow of air from the first end towards the second end or from the second end towards the first end;

the method comprising:

advancing the first carriage carrying lumber to be dried stacked upon the first carriage with spacers to allow air flow across the lumber on the at least one pathway towards the first end of the structure; and advancing the first carriage into the first end of the structure and continuing to move the first carriage through the structure and out through the second end of the structure to submit the lumber on the first carriage to air flow in a series of at least two subsections, with each subsection having air flow moving in only a [one] *first* circulation direction or a different circulation direction opposite of the [one] *first* circulation direction; and such that the first carriage moving from the first end to the second end is exposed alternatively to air moving in the [one] *first* circulation direction across the lumber then to air moving in the different circulation direction without a need to reverse fans from the [one] *first* circulation direction to the different circulation direction.

13. The method of claim 12 where the [one] *first* circulation direction moves air flow across the first carriage from a first side of the structure to a second side of the structure.

14. The method of claim 12 where the [one] *first* circulation direction moves air flow across the first carriage from a second side of the structure to a first side of the structure.

15. The method of claim 12 wherein the first carriage traveling through the main drying section is exposed to a same duration of air flow moving in the [one] *first* circulation direction as to air flow moving in the different circulation direction.

16. The method of claim 12 wherein the first carriage moves continuously through the structure from the first end to the second end.

17. The method of claim 12 wherein the first carriage is moved intermittently from the first end to the second end.

18. The method of claim 12 wherein the fans circulating air in the subsections of the structure continue to move air without stopping and reversing fan direction for an entire time that the first carriage is within the structure.

19. The method of claim 12 wherein the main drying section is heated by steam passing through heat exchangers exposed to moving air.

20. The method of claim 12 wherein air used in the main drying section is heated through use of a direct fire burner.

*21. A method of curing lumber wherein lumber is stacked upon a first carriage with spacers to allow air flow across the lumber to be dried, the method using a structure comprising:*

*at least one pathway for carriages holding lumber to be dried;*

*a first end of the structure for ingress of carriages holding lumber on the at least one pathway;*

*a second end of the structure for egress of carriages on the at least one pathway;*

*a main drying section located between the first end and the second end;*

*the main drying section receiving heat input to dry the lumber to be dried;*

*a set of partition baffles to subdivide the main drying section into at least two subsections, the partition baffles operating to allow passage of carriages holding lumber to be dried towards the second end but interfere with a longitudinal flow of air from the first end towards the second end or from the second end towards the first end;*

*the method comprising:*

*advancing the first carriage carrying lumber to be dried stacked upon the first carriage with spacers to allow air flow across the lumber on the at least one pathway towards the first end of the structure; and*

*advancing the first carriage into the first end of the structure and continuing to move the first carriage through the structure and out through the second end of the structure to submit the lumber on the first carriage to air flow in a series of at least two subsections, with each subsection having air flow moving in only a first circulation direction or a different circulation direction opposite of the first circulation direction; and*

*such that the first carriage moving from the first end to the second end is exposed alternatively to air moving in the first circulation direction across the lumber then to air moving in the different circulation direction without a need to reverse an air flow circulation direction from the first circulation direction to the different circulation direction within either of the at least two subsections.*

*22. The method of claim 21 where the first circulation direction moves air flow across the first carriage from a first side of the structure to a second side of the structure.*

*23. The method of claim 21 where the first circulation direction moves air flow across the first carriage from a second side of the structure to a first side of the structure.*

*24. The method of claim 21 wherein the first carriage traveling through the main drying section is exposed to a same duration of air flow moving in the first circulation direction as to air flow moving in the different circulation direction.*

*25. The method of claim 21 wherein the first carriage moves continuously through the structure from the first end to the second end.*

*26. The method of claim 21 wherein the first carriage is moved intermittently from the first end to the second end.*

*27. The method of claim 21 wherein advancing the first carriage into the first end of the structure and continuing to move the first carriage through the structure and out through the second end of the structure to submit the lumber on the first carriage to air flow in a series of at least two subsections, with each subsection having air flow moving in only the first circulation direction or the different circulation direction opposite of the first circulation direction subjects the first carriage to air flow across the lumber to be dried for an entirety of the time that the first carriage is within the structure.*

*28. The method of claim 21 wherein the main drying section is heated by steam passing through heat exchangers exposed to moving air.*

*29. The method of claim 21 wherein air used in the main drying section is heated through use of a direct fire burner.*

*30. The method of claim 21 wherein the air flow moving in only the first circulation direction or the different circulation direction opposite of the first circulation direction is circulated using a set of fans located with the structure.*

*31. The method of claim 21 wherein the air flow moving in only the first circulation direction or the different circulation direction opposite of the first circulation direction is circulated using a set of fans located in openings in a center wall that extends above a fan deck located above the at least first pathway for carriages holding lumber.*

* * * * *